No. 701,788. Patented June 3, 1902.
E. BERGER.
BINOCULAR MAGNIFYING GLASS.
(Application filed May 23, 1898.)
(No Model.)
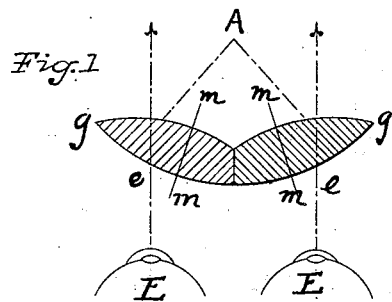
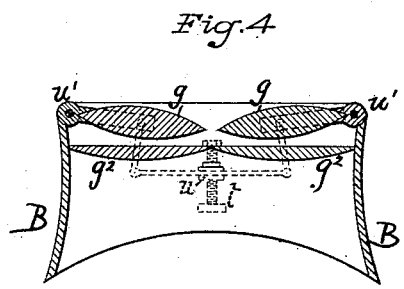
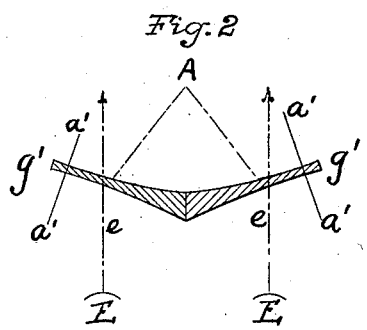
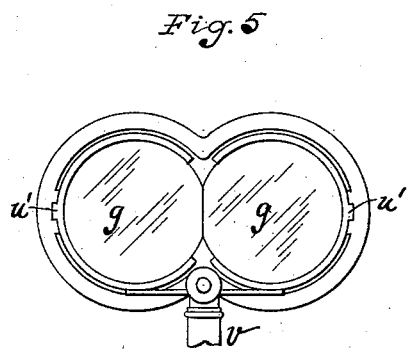
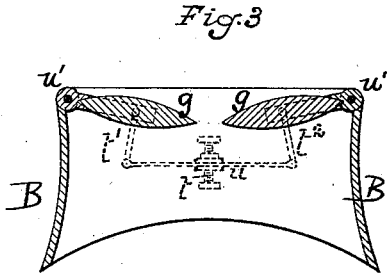
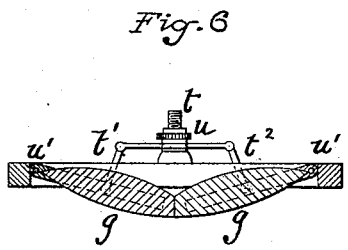
WITNESSES:  INVENTOR
Walter Abbe Emile Berger
Charles C. Abbe BY
Howson and Howson
his ATTORNEYS

UNITED STATES PATENT OFFICE.

EMILE BERGER, OF PARIS, FRANCE.

BINOCULAR MAGNIFYING-GLASS.

SPECIFICATION forming part of Letters Patent No. 701,788, dated June 3, 1902.

Application filed May 23, 1898. Serial No. 681,471. (No model.)

*To all whom it may concern:*

Be it known that I, EMILE BERGER, a citizen of the Republic of France, residing in Paris, France, have invented certain new and useful Improvements in Binocular Magnifying-Glasses, of which the following is a specification.

The main object of my invention is to so construct a binocular magnifying-glass that it can be used without fatiguing the muscles of the eyes, while giving a perfect image with strong reliefs.

In the accompanying drawings, Figures 1 and 2 are diagrams illustrating the principle of my invention. Fig. 3 is a sectional view of a binocular magnifying-glass constructed in accordance with my invention. Fig. 4 is a similar view of a modification, and Figs. 5, 6, and 7 are views of other modifications.

The form of magnifying-glass most commonly used by engravers, watchmakers, naturalists, &c., is a monocle, to be used with one eye only, while the other eye is kept closed or the image projected on its retina is suppressed. The use of these monocles is objectionable not only because the images produced are lacking in relief, but also because excessive use of one eye is injurious. Binocular magnifying-glasses have been heretofore proposed; but they have been composite ones, and they carry with them the objections that they magnify too much, the field of vision is too small, they are too expensive, and their use, if otherwise feasible, would call for new conditions of focal distance for the workman, and, finally, they would require the eyes of the user to stand in a position of strong convergence, which would be very tiring and injurious in continued use. My invention does away with these inconveniences and makes it possible for the workman to use my binocular magnifying-glass under accustomed conditions of focal distance with large field of vision with the aid of both eyes, which, moreover, are not required to stand in a converging position, but substantially in the normal position of rest—that is, with the visual lines practically parallel with each other.

The principle of construction of my magnifying-glass will be understood on reference to Fig. 1, in which the eyes are indicated as in plan at E, and the visual lines of the eye are indicated at $e$. Two biconvex or plano-convex lenses $g\ g$ are provided, inclined toward each other and with their optical centers $m\ m$ decentric to the eye-axes and toward the median line. For this purpose the lenses, which are of the spherical type, will usually be cut off somewhat at their inner adjacent edges, as shown in Fig. 1; but this cutting off is not essential. With biconvex or plano-convex magnifying-lenses it is essential that the visual lines of the eyes shall be considerably toward the temple sides from the optical centers $m\ m$ of the lenses. Each lens is a prismatically-acting glass, and a nearby object, as at A, will have its image in a magnified form projected by the prismatic action of each lens toward one of the temples of the user, and the light-rays will be so refracted that they will get into the two eyes of the user in substantially parallel lines. Each eye thus sees an independent image, and the total impression on the brain will give an approximately exact conception of the conditions of relief of the object A magnified. It is obvious that by using concave lenses in the same way an instrument will be produced which, while not in one sense a magnifying-glass, yet permits near-sighted persons to see at the distance usual with engravers, &c., without their having to exert the musculi recti interni, or, in other words, without having to use the eyes with their axes converging. The term "magnifying-glass" as used in this specification therefore is employed in a sufficiently general sense to apply to a binocular glass with biconcave lenses, as well as one with biconvex or plano-convex lenses.

In Fig. 2 I have illustrated diagrammatically a pair of biconcave lenses combined in accordance with the principle of my invention. These lenses are inclined toward each other, as before described, and they have their optical axes $a'\ a'$ decentered from the visual lines $e$; but in this case the optical axes $a'\ a'$ are on the temple side instead of the nose side of the visual lines. The action, however, is the same as described with reference to Fig. 1. Each eye sees an independent image of the object A, and the light-rays enter the two eyes in substantially parallel lines. In both constructions the two decentered and prismatically-acting lenses are inclined toward each other.

In Figs. 3 to 7 I have shown different forms of my binocular glass. The constructions shown in Figs. 3 and 4 are particularly adapted for watchmakers' use, means being contrived for giving the decentered lenses different inclinations, according to their required focal distance. This change in the inclination of the lenses toward one another may be effected by means of a nut $u$, moved by the rotation of a screw-threaded rod $t$, the nut $u$ being connected to the lens-mountings by rods $t'$ $t^2$. The casing or hood B, which supports the lenses by the hinged connections $u'$, may be fixed to the forehead of the user by means of ribbons or strings to be tied at the back of his head.

To correct astigmatic distortions of the image occasioned by the inclination of very strong convex glasses, cylindrical lenses $g^2$ may be placed behind the biconvex lenses, as illustrated in Fig. 4.

In Figs. 5 and 6 I have shown in front view and sectional plan, respectively, an experimental binocular magnifying-glass for determining the relation of the angle of inclination to the focal distance for each special case. The binocular magnifying-glass shown in these figures can be held in the hand by means of the handle $v$. Its lenses $g$ $g$ are biconvex or plano-convex. By means of the nut $u$ on the screw-threaded spindle $t$ and the connecting-rods $t'$ $t^2$ the lenses can be adjusted on their hinges $u'$ to different angles with reference to each other for the different conditions. Decentered and prismatically-acting lenses inclined toward each other, as described, may be made up in the form of a pair of eyeglasses, as will be understood on reference to the plan view, Fig. 7.

I claim as my invention—

A binocular optical glass for examining nearby objects, said glass having two prismatically-acting lenses inclined toward each other and arranged decentrically with reference to the eye-axis of the user, to transmit the visual rays to the two eyes in practically parallel lines, substantially as and for the purpose set forth.

Signed at Paris, in the Republic of France, this 27th day of April, 1898.

EMILE BERGER.

Witnesses:
GEORGE LAUREND,
EUG. WATTIER.